US009489513B1

(12) United States Patent
Mesropian

(10) Patent No.: US 9,489,513 B1
(45) Date of Patent: Nov. 8, 2016

(54) SYSTEMS AND METHODS FOR SECURING COMPUTING DEVICES AGAINST IMPOSTER PROCESSES

(71) Applicant: Symantec Corporation, Mountain View, CA (US)

(72) Inventor: Haik Mesropian, Glendale, CA (US)

(73) Assignee: Symantec Corporation, Mountain View, CA (US)

( * ) Notice: Subject to any disclaimer, the term of this patent is extended or adjusted under 35 U.S.C. 154(b) by 126 days.

(21) Appl. No.: 13/926,050

(22) Filed: Jun. 25, 2013

(51) Int. Cl.
*G06F 11/00* (2006.01)
*G06F 21/56* (2013.01)

(52) U.S. Cl.
CPC .................................. *G06F 21/562* (2013.01)

(58) Field of Classification Search
CPC ................................ G06F 21/12; G06F 21/14
USPC ......................................................... 726/22–25
See application file for complete search history.

(56) References Cited

U.S. PATENT DOCUMENTS

| | | | | |
|---|---|---|---|---|
| 2005/0182964 A1* | 8/2005 | Jooste | G06F 21/53 | 726/22 |
| 2007/0294765 A1* | 12/2007 | Rihn | G06F 21/56 | 726/22 |
| 2009/0320134 A1* | 12/2009 | Corcoran | G06F 21/562 | 726/24 |
| 2011/0093952 A1* | 4/2011 | Kumar | G06F 21/51 | 726/24 |
| 2011/0191850 A1* | 8/2011 | Turbin | G06F 11/00 | 726/24 |
| 2011/0225655 A1* | 9/2011 | Niemela | G06F 21/566 | 726/24 |
| 2013/0198800 A1* | 8/2013 | Bezilla | G06F 21/552 | 726/1 |
| 2013/0219501 A1* | 8/2013 | Park | G06F 21/50 | 726/23 |
| 2014/0013434 A1* | 1/2014 | Ranum | H04L 63/145 | 726/24 |
| 2014/0123279 A1* | 5/2014 | Bishop | H04L 63/1491 | 726/23 |
| 2014/0130161 A1* | 5/2014 | Golovanov | G06F 21/564 | 726/23 |
| 2014/0189859 A1* | 7/2014 | Ramanan | G06F 21/56 | 726/22 |

OTHER PUBLICATIONS

Perdisci et al., "Misleading worm signature generators using deliberate noise injection," 2006 IEEE Symposium on Security and Privacy (S&P'06) Year: 2006 pp. 15-31.*
Su et al., "Suspicious URL Filtering Based on Logistic Regression with Multi-view Analysis," Information Security (Asia JCIS), 2013 Eighth Asia Joint Conference on Year: 2013 pp. 77-84.*

* cited by examiner

*Primary Examiner* — Roderick Tolentino
(74) *Attorney, Agent, or Firm* — ALG Intellectual Property, LLC

(57) ABSTRACT

A computer-implemented method for securing computing devices against imposter processes may include (1) identifying a process that is subject to a security assessment, (2) determining, based on comparing an attribute of the process to an attribute of a legitimate process, that the process comprises an imposter process of the legitimate process, (3) determining that a file may have been created by the imposter process, and (4) determining a security action for the file in response to determining that the file has been created by the imposter process. Various other methods, systems, and computer-readable media are also disclosed.

20 Claims, 7 Drawing Sheets

SYSTEMS AND METHODS FOR SECURING COMPUTING DEVICES AGAINST IMPOSTER PROCESSES

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures (e.g., hash functions that uniquely identify malware) to their customers on a regular basis. However, a significant amount of malware has not yet been identified and therefore cannot be detected using traditional signature-based malware-detection mechanisms, particularly since malware authors may regularly modify their malware in an attempt to circumvent commonly employed signature-based malware-detection mechanisms.

Additionally, some malware may pose as programs known to be legitimate (e.g., to disguise its presence from users and avoid removal). In some cases, these imposter programs may place additional malware on computing systems, and traditional signature-based methods of detection may fail to detect some or all of the additional malware. Accordingly, the instant disclosure identifies and addresses a need for additional and improved systems and methods for securing computing devices against imposter processes.

SUMMARY

As will be described in greater detail below, the instant disclosure generally relates to systems and methods for securing computing devices against imposter processes by comparing a process to a legitimate process in order to determine that the process may be an imposter process and by treating the imposter process and/or any files created by the imposter process with more suspicion. For example, these systems and methods may subject the imposter process and/or files created by the imposter process to a heightened level of security analysis.

In one example, a computer-implemented method for securing computing devices against imposter processes may include (1) identifying a process that is subject to a security assessment, (2) determining, based on comparing an attribute of the process to an attribute of a legitimate process, that the process includes an imposter process of the legitimate process, (3) determining that a file has been created by the imposter process, and (4) determining a security action for the file in response to determining that the file has been created by the imposter process.

In some examples, comparing the attribute of the process to the attribute of the legitimate process may include comparing a name of the process to a name of the legitimate process. In these examples, determining that the process includes the imposter process includes determining that the name of the process falls within a predetermined match threshold of the name of the legitimate process.

Additionally or alternatively, comparing the attribute of the process to the attribute of the legitimate process may include comparing a path of the process to an expected path of the legitimate process. In some examples, comparing the attribute of the process to the attribute of the legitimate process may include determining that the process does not include a digital signature that matches a digital signature of the legitimate process. In other examples, comparing the attribute of the process to the attribute of the legitimate process may include comparing a hash of the process to a hash of the legitimate process.

In some examples, determining that the process may include an imposter process includes determining that the process includes an instance of the legitimate process that has loaded a malicious module. In these examples, the malicious module may be not present in a trusted instance of the legitimate process. In such embodiments, the computer-implemented method may further include removing the malicious module from the instance of the legitimate process.

In some embodiments, determining the security action for the file in response to determining that the file has been created by the imposter process may include lowering a conviction threshold for the file. Additionally or alternatively, determining the security action for the file in response to determining that the file has been created by the imposter process may include increasing a level of computing resources used to scan the file. In at least one embodiment, the security action may include at least one of (1) notifying a user about the file, (2) deleting the file, and/or (3) quarantining the file. Additionally or alternatively, the security action may include (1) blocking the imposter process from creating an additional file and/or (2) quarantining an additional file created by the imposter process.

In one embodiment, a system for implementing the above-described method may include (1) a process identification module that identifies a process that is subject to a security assessment, (2) an imposter determination module that determines, based on comparing an attribute of the process to an attribute of a legitimate process, that the process includes an imposter process of the legitimate process, (3) a file determination module that determines that a file has been created by the imposter process, (4) a security determination module that determines a security action for the file in response to determining that the file has been created by the imposter process, and (5) at least one processor configured to execute the process identification module, the imposter determination module, the file determination module and the security determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a process that is subject to a security assessment, (2) determine, based on comparing an attribute of the process to an attribute of a legitimate process, that the process includes an imposter process of the legitimate process, (3) determine that a file has been created by the imposter process, and (4) determine a security action for the file in response to determining that the file has been created by the imposter process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
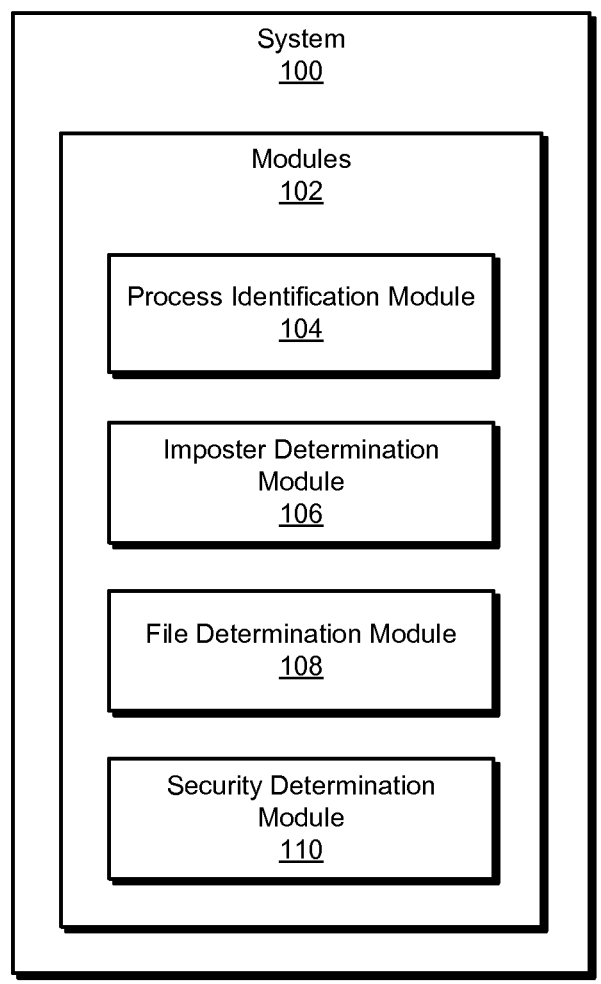
FIG. 1 is a block diagram of an exemplary system for securing computing devices against imposter processes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for securing computing devices against imposter processes. As will be explained in greater detail below, by comparing processes to legitimate processes and determining security actions for files created by imposter processes, systems described herein may more accurately and quickly detect and contain potentially malicious files created by imposter processes. Potentially malicious files may not need to be in a database or have a stored signature in order to be subject to security measures if the files may have been created by an imposter process, thus allowing systems described herein to take security actions against potentially malicious files that may otherwise have not been detected.

Figure 2:
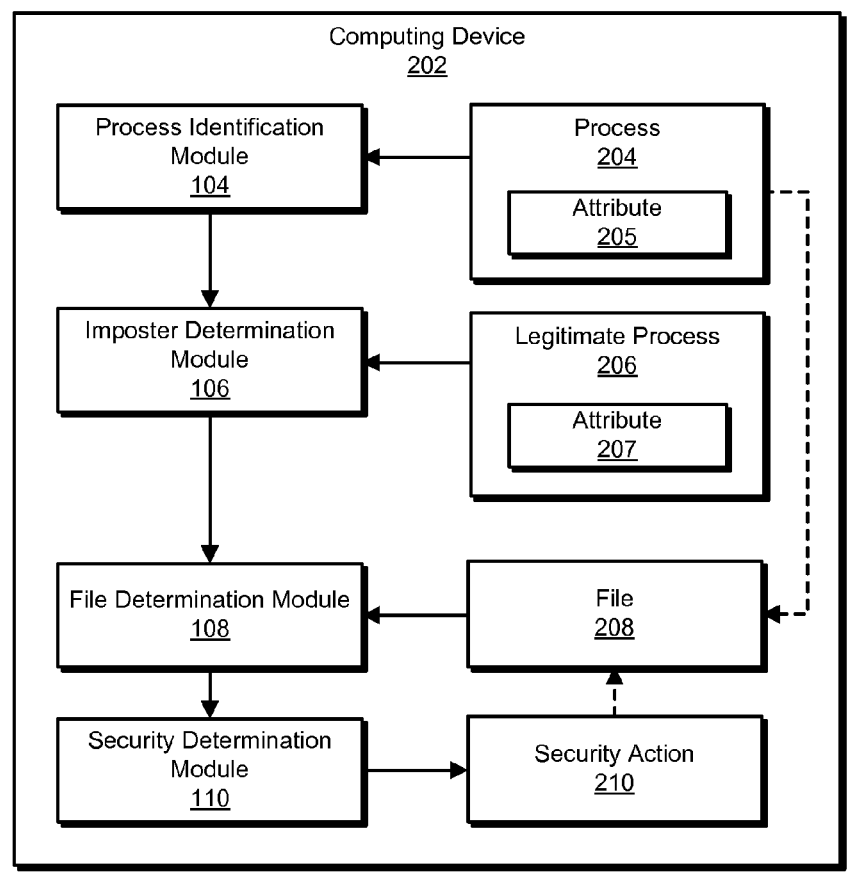
FIG. 2 is a block diagram of an exemplary system for securing computing devices against imposter processes.
Figure 3:
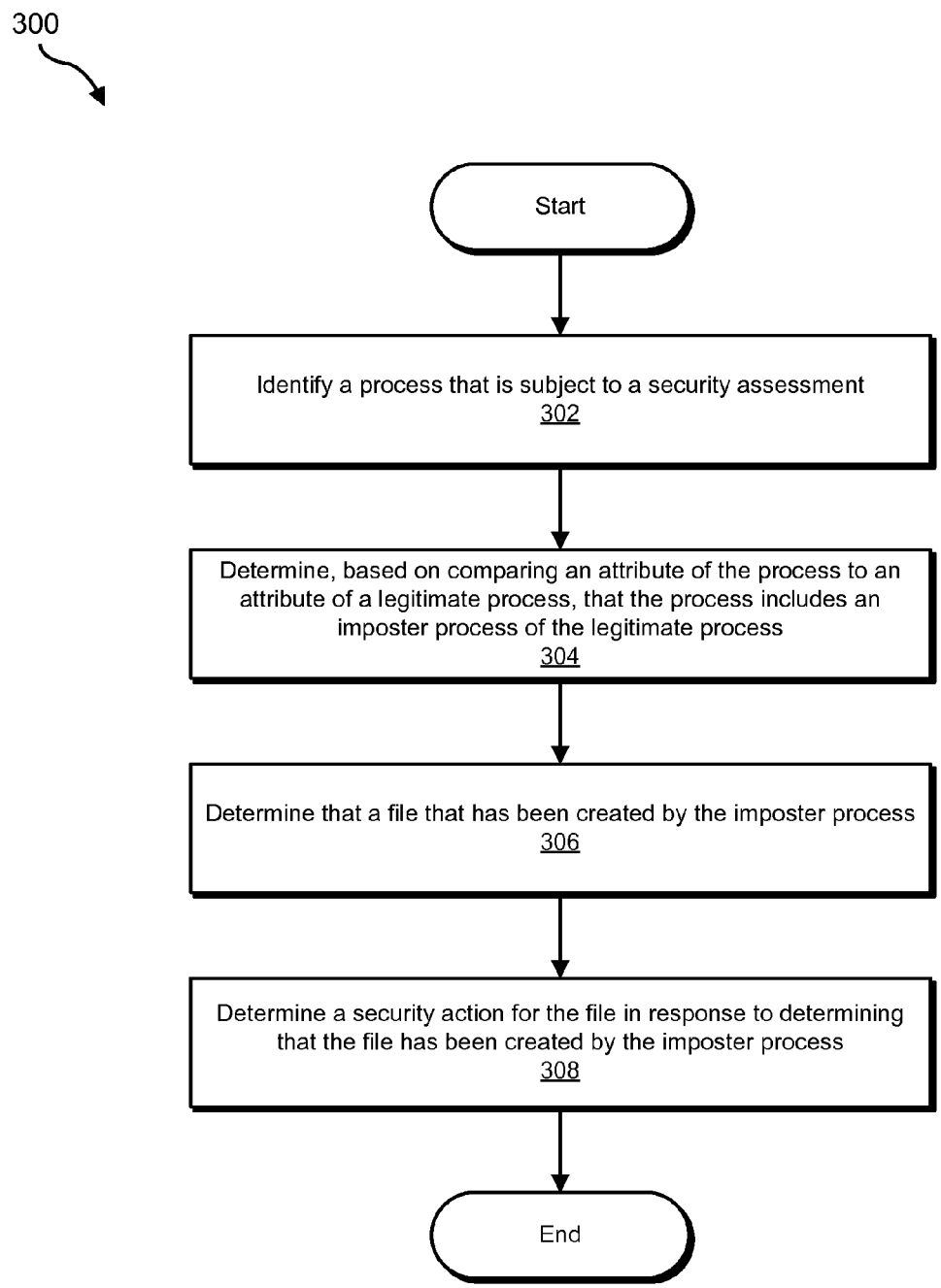
FIG. 3 is a flow diagram of an exemplary method for securing computing devices against imposter processes.
Figure 4:
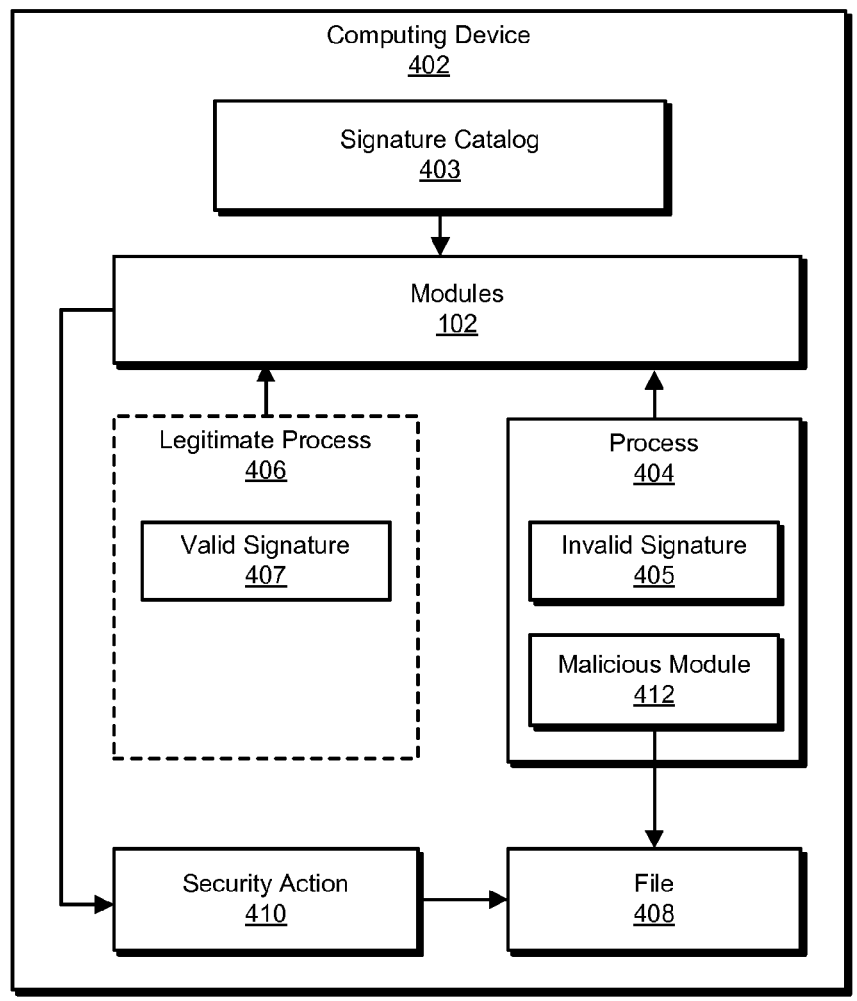
FIG. 4 is a block diagram of an exemplary system for securing computing devices against imposter processes.

The following will provide, with reference to FIGS. 1, 2, and 4, detailed descriptions of exemplary systems for securing computing devices against imposter processes. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for securing computing devices against imposter processes. As illustrated in this figure, exemplary system 100 may include one or more modules 102 for performing one or more tasks. For example, and as will be explained in greater detail below, exemplary system 100 may include a process identification module 104 that may identify a process that is subject to a security assessment. Exemplary system 100 may additionally include an imposter determination module 106 that may determine, based on comparing an attribute of the process to an attribute of a legitimate process, that the process includes an imposter process of the legitimate process.

Exemplary system 100 may also include a file determination module 108 that may identify a file that has been created by the imposter process. Exemplary system 100 may additionally include a security determination module 108 that may determine a security action for the file in response to determining that the file has been created by the imposter process. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. Computing device 202 may be programmed with one or more of modules 102.

In one embodiment, one or more of modules 102 from FIG. 1 may, when executed by at least one processor of computing device 202, facilitate computing device 202 in securing computing devices against imposter processes. For example, and as will be described in greater detail below, one or more of modules 102 may cause computing device 202 to securing computing devices against imposter processes. For example, and as will be described in greater detail below, process identification module 104 may be programmed to identify a process 204 that is subject to a security assessment. Imposter determination module 106 may be programmed to determine, based on comparing an attribute 205 of process 204 to an attribute 207 of a legitimate process 206, that process 204 includes an imposter process of legitimate process 206. File determination module 106 may be programmed to identify a file 208 that has been created by the imposter process. Security determination module 108 may be programmed to determine a security action 210 for file 208 in response to file 208 having been created by the imposter process.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

FIG. 3 is a flow diagram of an exemplary computer-implemented method 300 for securing computing devices against imposter processes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a process that is subject to a security assessment. For example, at step 302 process identification module 104 may, as part of computing device 202 in FIG. 2, identify process 204 that is subject to a security assessment.

The term "process," as used herein, may refer to any executable file and/or any computing process launched by the executable file. A computing process may include any code running on a computing device including applications, individual processes, and/or background processes. For example, the executable file "lsass.exe" may launch a process called "lsass.exe," and either or both of these may be referred to in examples as the process "lsass.exe."

The phrase "security assessment," as used herein, generally refers to any actions or set of actions undertaken with the purpose of securing a computing system or set of computing systems against potential threats. Examples include, without limitation, malware scans and/or activity logging.

Process identification module 104 may identify the process in any suitable context. For example, process identification module 104 may identify a process that is subject to a malware scan. In some examples, as will be described in greater detail below, process identification module 104 may identify the process by identifying the name and/or path of the process. Additionally or alternatively, process identification module 104 may identify the process by identifying an action the process has taken (e.g., creating and/or downloading a file).

In one example, process identification module 104 may identify a process named "Izass.exe" that is subject to a virus scan by SYMANTEC AUTO-PROTECT. For example, Izass.exe may be subject to a virus scan due to "Izass.exe" having a name similar to the known legitimate process "lsass.exe". Additionally or alternatively, the virus scan may target all currently running processes.

At step 304 one or more of the systems described herein may determine, based on comparing an attribute of the process to an attribute of a legitimate process, that the process may include an imposter process of the legitimate process. For example, at step 304 imposter determination module 106 may, as part of computing device 202 in FIG. 2, determine, based on comparing attribute 205 of process 204 to attribute 207 of legitimate process 206, that process 204 includes an imposter process of legitimate process 206.

As used herein, the phrase "imposter process" generally refers to any process presenting itself as a legitimate process. An imposter process may present itself as a legitimate process by having a name that is the same as or similar to the name of a legitimate process, by being located in a path that is the same as or similar to a legitimate process, and/or by infecting a legitimate process with a module. In some embodiments, an imposter process may be malicious. For example, an imposter process may include a malware program. In one example, an imposter process "Izass.exe" may be an imposter of an operating system process but may instead download malicious files.

Imposter determination module 106 may determine that the process includes an imposter process in any of a variety of ways. In some examples, imposter determination module 106 may determine that the process includes an imposter process by comparing one or more attributes of the imposter process to one or more attributes of a known legitimate process and identifying a difference between the imposter process and the known legitimate process. For example, imposter determination module 106 may determine that the process includes an imposter process based on comparing a name, path, hash, and/or digital signature of the process to a known legitimate process.

As an example, imposter determination module 106 may determine that the "Izass.exe" process is an imposter process of the legitimate process "lsass.exe" based on the "Izass.exe" process being located at the "C:\WINDOWS\system32" path, which is the expected path of "lsass.exe."

Imposter determination module 106 may determine that a process includes an imposter process by making any or all of a variety of comparisons. In some examples, imposter determination module 106 may determine that a process may include an imposter process by comparing a name of the process to a name of the legitimate process. In these examples, determining that the process may include the imposter process may include determining that the name of the process falls within a predetermined match threshold of the name of the legitimate process. Imposter determination module 106 may do so by calculating an edit distance (e.g., a Levenshtein distance) between the name of the process and the name of the legitimate process and determine that the edit distance falls below a predetermined threshold. For example, imposter determination module 106 may determine that the edit distance is two characters or fewer and/or that the edit distance is smaller than 10% the length of the name of the legitimate process. As an example, imposter determination module 106 may determine that the name "Izass.exe" and the name "lsass.exe" have an edit distance of one (e.g., because the substitution of one character can transform one name into the other) and that, therefore, the two names fall within a predetermined match threshold (e.g., having an edit distance of two or lower).

In addition to or instead of relying on edit distances of characters to determine whether a file name falls within a predetermined match threshold, imposter determination module 106 may determine that the name of a process falls within a predetermined match threshold of the name of a legitimate process based on determining that the name of the process includes one or more homoglyphs in place of one or more characters in the name of the legitimate process. For example, imposter determination module 106 may determine that the name "Isass.exe" (with a capital "I" as in "India") falls within a predetermined match threshold of "lsass.exe" (with a lowercase "l" as in "Lima").

Imposter determination module 106 may, in addition to or instead of evaluating a name of a process, determine that a process includes an imposter process by comparing a path of the process to an expected path of a legitimate process. For example, a process "svchost.exe" may be located at the path "C:\WINDOWS\Temp" instead of the expected path for the legitimate process "svchost.exe," which may be "C:\WINDOWS\system32." Imposter determination module 106 may determine that, because the process "svchost.exe" is not located at the expected path for a legitimate process, it may be an imposter process.

Additionally or alternatively, imposter determination module 106 may compare an attribute of the process to an attribute of the legitimate process by determining that the process may not include a digital signature that matches a digital signature of the legitimate process. For example, imposter determination module 106 may expect a legitimate "svchost.exe" process to include a digital signature created by MICROSOFT. If imposter determination module 106 encounters a "svchost.exe" process that does not include a digital signature, or includes a digital signature created by a different signatory, imposter determination module 106 may determine that the unsigned or improperly signed "svchost.exe" process is an imposter process.

In some examples, imposter determination module 106 determine that a process may include an imposter process by checking a catalog of digital signatures. Such a catalog may indicate or imply that a process should be signed by a specific signatory. In such embodiments, if the process is not signed as indicated or implied by the catalog, imposter determination module 106 may determine that the process includes an imposter process. For example, the catalog file may imply that the process "chrome.exe" may be signed by GOOGLE. If the process "chrome.exe" is at the expected path, but is not signed by GOOGLE, imposter determination module 106 may determine that the process is an imposter process.

In some additional examples, imposter determination module 106 may determine that a process may include an imposter process by comparing a hash of the process to a hash of the legitimate process. For example, the operating system in which the security assessment may be running may have a list of legitimate processes and corresponding hashes. Accordingly, imposter determination module 106 may compare the hash of the process with the hash of a legitimate process that appears to correspond to the process to determine whether the hashes match. As an example, imposter determination module 106 may compare the hash "AF35DG1" for process "svchost.exe" to the stored hash "AF36DF2" for legitimate process "svchost.exe" and may determine that the two hashes do not match. Based on this determination, imposter determination module 106 may determine that "svchost.exe" is an imposter process.

In some examples, imposter determination module 106 may determine that a process includes an instance of a legitimate process that may have loaded a malicious module. In these examples, the malicious module may not be present in a trusted instance of the legitimate process. For example, the suspect process may be "lsass.exe" and may be at the correct path for the legitimate process "lsass.exe," but the suspect process may include a malicious module that may not be present in trusted instances of the legitimate "lsass.exe" process. The malicious module may create malicious files and/or perform other malicious activities not performed by the legitimate process.

When imposter determination module 106 encounters a process infected with a malicious module, the systems described herein may remove the malicious module from the instance of the legitimate process. In some examples, imposter determination module 106 may remove the malicious module by installing a fresh instance of the legitimate process that may not include the malicious module. For example, systems described herein may download a new instance of "lsass.exe" from a trusted source.

In some examples, systems described herein may use digital signatures to identify an imposter process. FIG. 4 is a block diagram of an exemplary computing system 400 for securing computing devices against imposter processes. As shown in FIG. 4, one or more of modules 102 may cause computing system 400 to use digital signatures to identify an imposter process. Using FIG. 4 as an example, imposter determination module 106 may, as a part of computing device 402, use signature catalog 403 to build a list of signed files and their paths on computing device 402. Imposter determination module 106 may identify process 404 that is at the expected path of legitimate process 406. Process 404 may include invalid signature 405 that does not match the expected valid signature 407 for legitimate process 406. Because of invalid signature 405, imposter determination module 106 may determine that process 404 is an imposter process of legitimate process 406. In some examples, process 404 may include malicious module 412. Malicious module 412 may create a file 408 that may be a malicious file. Imposter determination module 106 may determine that file 408 may have been created by process 404 and/or may perform security action 410 on file 408.

In one example, imposter determination module 106 may, as part of performing a virus scan, read a .CAT file and extract a list of process names and/or paths including a process named "svchost.exe" at the expected path "C:\Windows\system32" that is expected to be signed by MICROSOFT. The virus scan may check the file "svchost.exe" at path "C:\Windows\system32" and may determine that the file does not include a valid digital signature from MICROSOFT. Based on the file not including a valid digital signature, imposter determination module 106 may determine that the file may include an imposter process. Additionally, imposter process "svchost.exe" may include a malicious module that may have created a file "spyware.exe." Imposter determination module 106 may determine that the file "spyware.exe" has been created by the imposter process and, based on that determination, may delete the file "spyware.exe."

Returning to FIG. 3, at step 306 one or more of the systems described herein may determine that a file has been created by the imposter process. For example, at step 306 file determination module 108 may, as part of computing device 202 in FIG. 2, determine that file 208 has been created by the imposter process (e.g., process 204).

File determination module 108 may determine that the file has been created by the imposter process in any of a variety of ways. For example, file determination module 108 may determine that a file has been generated by the imposter process (e.g., data and/or algorithms internal to the imposter process). The file generated by the imposter process may include malware. In one example, file determination module 108 may determine that a file "malwr.exe" has been created by the imposter process "lzass.exe."

Instead of determining that a file was generated by an imposter process on a computing system where the imposter process is executing, file determination module 108 may determine that the file was downloaded from an external source by the imposter process. For example, an imposter process may have downloaded the file from a server on the Internet. In one example, file determination module 108 may determine that a file "malwr.exe" has been downloaded by the imposter process from the "malware.com" server.

At step 308 one or more of the systems described herein may determine a security action for the file in response to determining that the file has been created by the imposter process. For example, at step 308 security determination module 110 may, as part of computing device 202 in FIG. 2, determine to take security action 210 on file 208 in response to determining that file 208 has been created by the imposter process (e.g., process 204).

Security determination module 110 may determine to take any of a variety of possible security actions for the file created by the imposter process. For example, security determination module 110 may determine that a file created by an imposter process may be suspicious and/or may require additional security measures beyond what would be applied to a file not created by an imposter process (e.g., security determination module 110 may determine that "malwr.exe" may be a malicious executable and may need to be quarantined).

In some examples, the security action may include lowering a conviction threshold for the file. For example, "malwr.exe" may not match any stored signatures for malicious executable and therefore may normally not be classified as a virus, but may be classified as a virus due to having been created by an imposter process. In another example, "malwr.exe" may be subject to a heuristic to determine malicious processes that may highly weight the criteria "created by an imposter process" and may thus convict the file "malwr.exe" despite the file not otherwise fulfilling sufficient criteria for conviction as malicious.

In some examples, the security action for the file may include increasing a level of computing resources used to scan the file. In some embodiments, increasing the level of computing resources may involve performing more steps in the scan, increasing the breadth of the scan, and/or increasing the depth of the scan. Increasing the breadth of the scan may include scanning more portions of the file. Increasing the depth of the scan may include performing a more detailed static analysis of the file and/or a longer dynamic analysis of the file. Increasing the level of computing resources may also include allocating more computing power to the scan, for example by increasing the amount of memory which the scan has access to. In one example, determination module 110 may subject the file to a cloud scan instead of or in addition to a local scan. One example of a cloud scan is the NORTON DOWNLOAD INSIGHT.

In one embodiment, the security action may include notifying a user about the file. For example, a user may be notified that the file "malwr.exe" may be suspected of being malicious, and the user may be given the option of quarantining, deleting, or ignoring the file. In some examples, the user may be the local user of the computing device. In other examples, the user may be a remote administrator of the computing device.

In some examples, security determination module 110 may perform the security action by (1) blocking the imposter process from creating an additional file and/or (2) quarantining the additional file created by the imposter process. For example, security determination module 110 may prevent imposter process "Izass.exe" from creating any additional files and/or may quarantine any additional files created by imposter process "Izass.exe".

Figure 5:
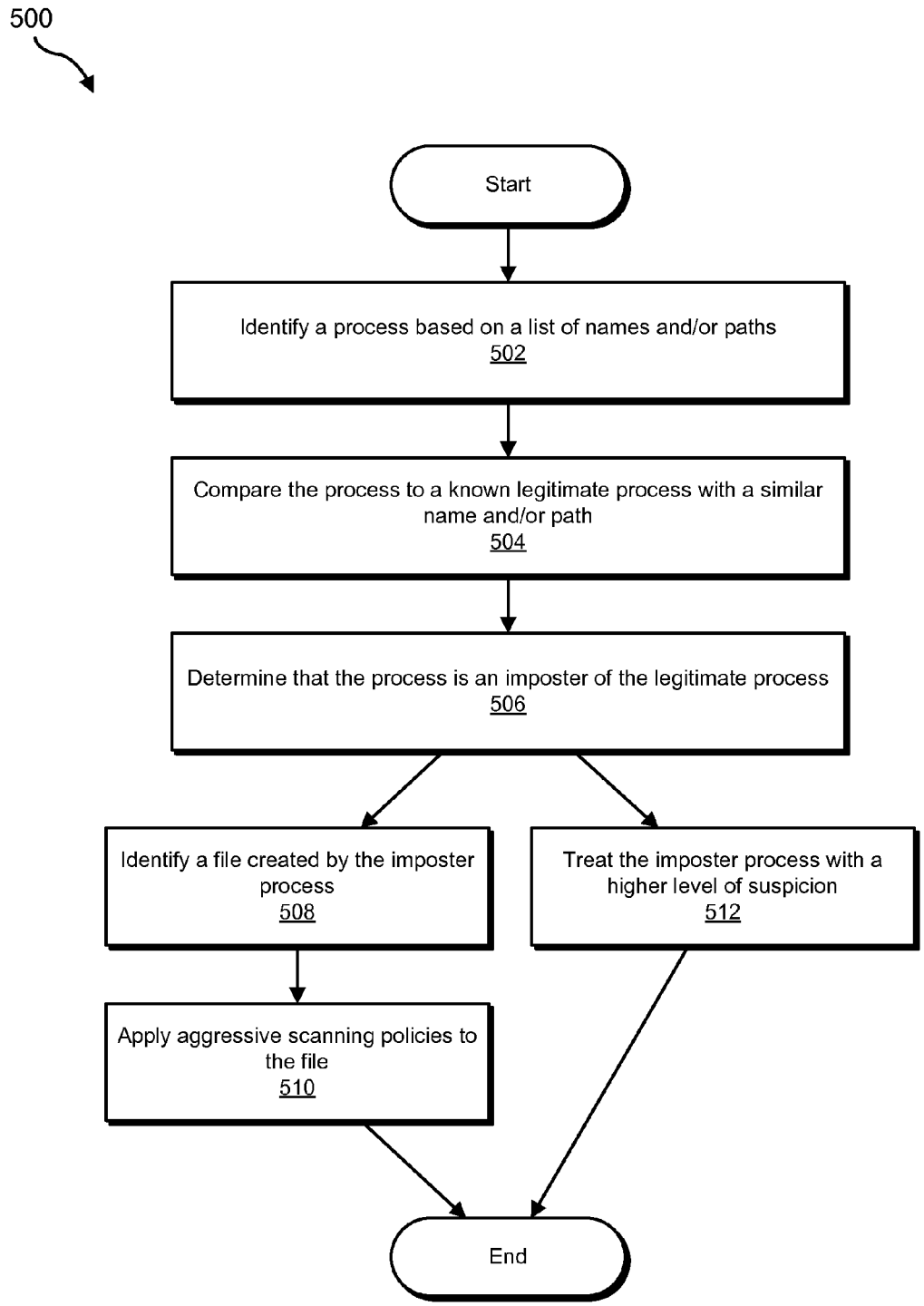
FIG. 5 is a flow diagram of an exemplary method for securing computing devices against imposter processes.

FIG. 5 is a flow diagram of an exemplary method 500 for securing computing devices against imposter processes. At step 502, systems described herein may identify a process based on a list of names and/or paths. In some embodiments, the list of names and/or paths may be dynamically built from a catalog file. At step 504, systems described herein may compare the process to a known legitimate process with a similar name and/or expected path. This may include comparing the processes names, paths, and/or expected digital signatures. At step 506 systems described herein may determine that the process is an imposter of the legitimate process. Based on this determination, systems described herein may apply more aggressive security policies to the imposter process.

In some examples, at step 508 systems described herein may identify a file created by the imposter process. In some embodiments, systems described herein may only check or may give priority to identifying files created by the imposter process in protected operating system folders. At step 510, systems described herein may apply aggressive scanning policies to the file. In some embodiments, this may include using a remote cloud-based scanner.

In some examples, at step 512 systems described herein may treat the imposter process with a higher level of suspicion. This may include aggressive scanning of the imposter process that requires more resources. Step 512 may occur consecutively or concurrently with step 508. In some examples, either step 512 or steps 508 and 510 may be omitted.

As explained above in connection with method 300 in FIG. 3, systems described herein may identify a process that is subject to a security assessment. The process may be subject to a security assessment because it has a similar name and/or path to a known legitimate process and may be suspected of being an imposter process. The security assessment may be a virus scan and/or malware scan.

In some examples, systems described herein may determine that the process is an imposter of a legitimate process. Determining that the process is an imposter process may involve making any number of comparisons between the process and at least one known legitimate process, including comparing the names, expected paths, signatures, and/or hashes of the processes. In some cases, the imposter process may be a legitimate process that has been injected with a malicious module. In these cases, systems described herein may remove the malicious module from the process, in some examples by installing a fresh copy of the process.

Once the imposter process has been determined, systems described herein may also determine that a file has been created by the imposter process. In some examples, creating the file may include downloading the file from an external source. Systems described herein may determine a security action for the file, including but not limited to subjecting the file to a more aggressive security assessment, lowering the threshold for convicting the file, deleting the file, quarantining the file, and/or informing a user about the file. In some cases, systems described herein may also perform a security action on the imposter process. By identifying imposter processes and taking security actions against files created by such processes, systems described herein can more accurately and quickly protect computing devices from malicious files and processes.

Figure 6:
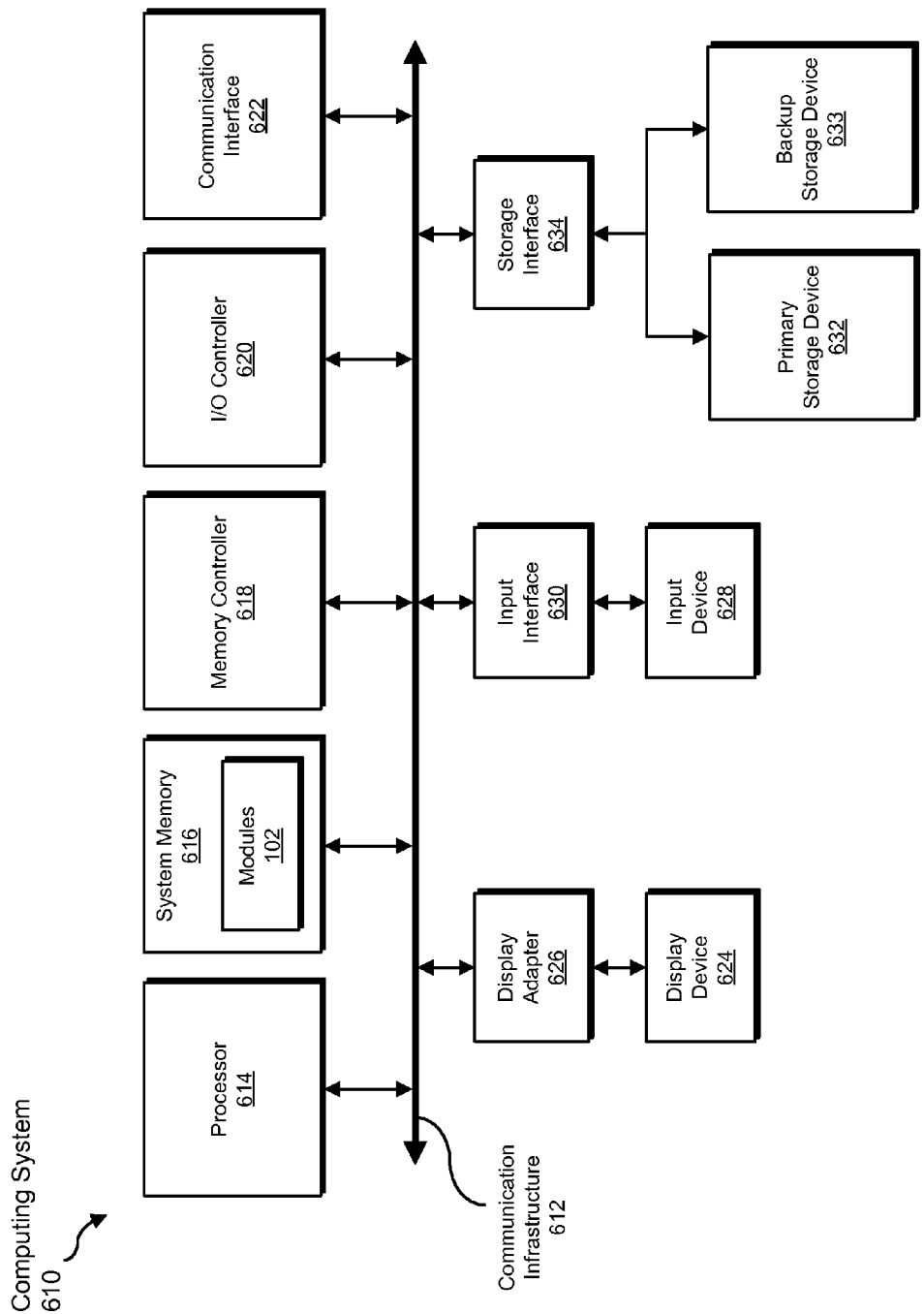
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
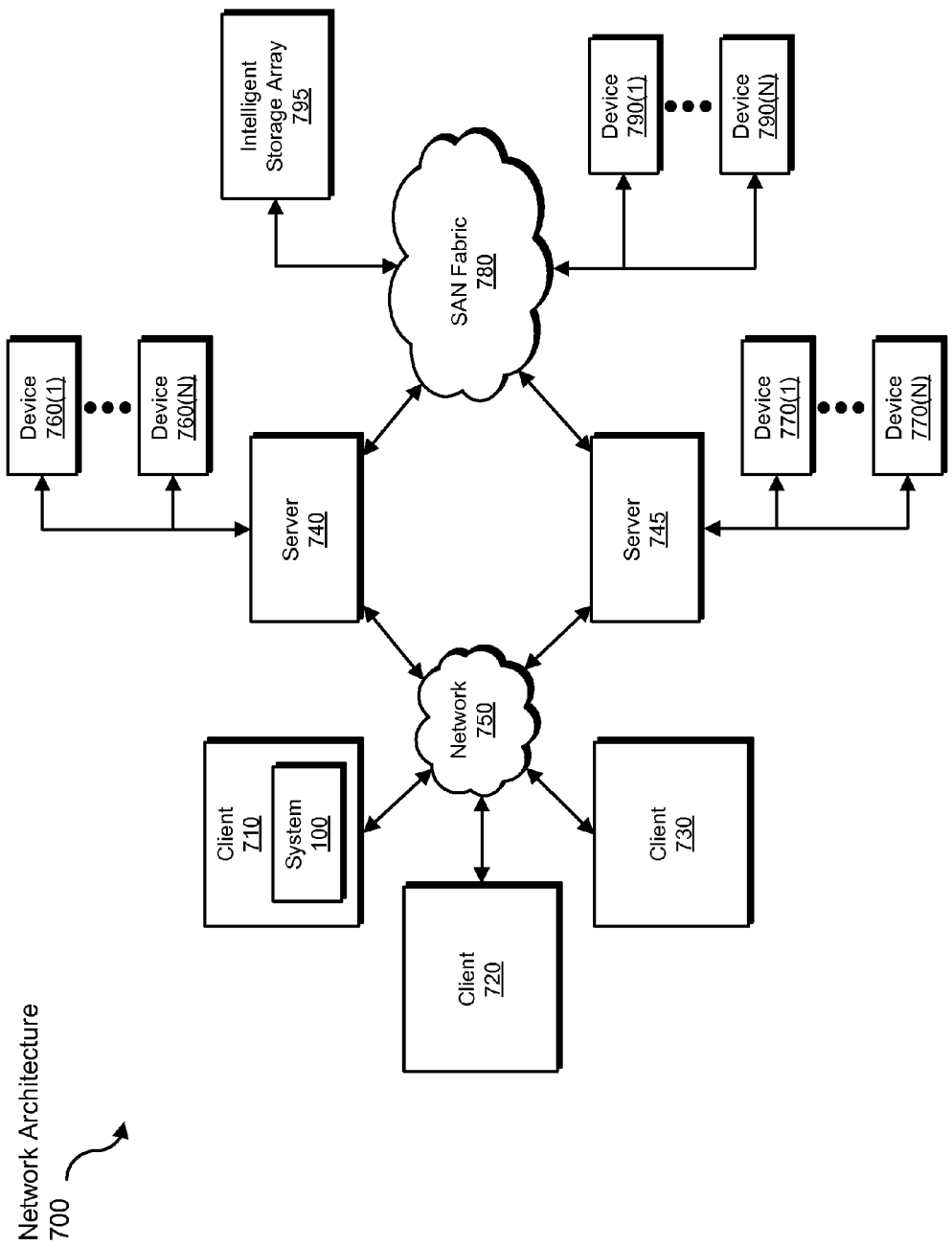
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for securing computing devices against imposter processes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive process data to be transformed, transform the process data, output a result of the transformation to a security policy, use the result of the transformation to take a security action, and store the result of the transformation to a security database.

Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securing computing devices against imposter processes, at least a portion of the method being performed by a computing device comprising at least one processor, the method comprising:
    identifying, by the computing device, a process executing on the computing device that is subject to a security assessment;
    determining, by the computing device initiating a query, based on comparing an attribute of the process to an attribute of a legitimate process, that a similarity between the process and the legitimate process meets a predetermined match threshold based at least in part on a similarity of a name of the process with a name of the legitimate process;
    identifying the legitimate process in response to determining that the similarity between the process and the legitimate process meets the predetermined match threshold;
    determining, by the computing device, in response to identifying the legitimate process, that the process is not the legitimate process at least in part by determining that at least one of:
        the process does not comprise a digital signature that matches a digital signature of the legitimate process; and
        a hash of the process does not match a hash of the legitimate process;
    determining, based at least in part on the similarity between the process and the legitimate process meeting the predetermined match threshold and at least in part on determining that the process is not the legitimate process, that the process comprises an imposter process of the legitimate process;
    determining, by the computing device, that a file has been created on the computing device by the imposter process;
    determining, by the computing device, a security action for the file on the computing device in response to determining that the file has been created by the imposter process;
    performing, by the computing device, the security action on the computing device for the file in response to determining the security action and thereby improving security on the computing device.

2. The computer-implemented method of claim 1, wherein comparing the attribute of the process to the attribute of the legitimate process comprises comparing a path of the process to an expected path of the legitimate process.

3. The computer-implemented method of claim 1, wherein determining that the process is not the legitimate process comprises determining that the process does not comprise the digital signature of the legitimate process.

4. The computer-implemented method of claim 1, wherein determining that the process is not the legitimate process comprises determining that the hash of the process does not match the hash of the legitimate process.

5. The computer-implemented method of claim 1, wherein determining that the process comprises an imposter process comprises determining that the process comprises an instance of the legitimate process that has loaded a malicious module, wherein the malicious module is not present in a trusted instance of the legitimate process.

6. The computer-implemented method of claim 5, further comprising removing the malicious module from the instance of the legitimate process.

7. The computer-implemented method of claim 1, wherein determining the security action for the file in response to determining that the file has been created by the imposter process comprises lowering a conviction threshold for the file.

8. The computer-implemented method of claim 1, wherein determining the security action for the file in response to determining that the file has been created by the imposter process comprises increasing a level of computing resources used to scan the file.

9. The computer-implemented method of claim 1, wherein the security action comprises at least one of:
    notifying a user about the file;
    deleting the file;
    quarantining the file;
    moving the file.

10. The computer-implemented method of claim 1, wherein the security action comprises at least one of:
    blocking the imposter process from creating an additional file;
    quarantining an additional file created by the imposter process.

11. A system for securing computing devices against imposter processes, the system comprising:
    a memory that stores executable modules;
    a process identification module, stored in the memory on a computing device, that identifies a process executing on the computing device that is subject to a security assessment;
    an imposter determination module, stored in the memory on the computing device, that:
        initiates a query to determine, based on comparing an attribute of the process to an attribute of a legitimate process, that a similarity between the process and the legitimate process meets a predetermined match threshold based at least in part on a similarity of a name of the process with a name of the legitimate process;
        identifying the legitimate process in response to determining that the similarity between the process and the legitimate process meets the predetermined match threshold;

determines, in response to identifying the legitimate process, that the process is not the legitimate process at least in part by determining that at least one of:
   the process does not comprise a digital signature that matches a digital signature of the legitimate process; and
   a hash of the process does not match a hash of the legitimate process;
determines, based at least in part on the similarity between the process and the legitimate process meeting the predetermined match threshold and at least in part on determining that the process is not the legitimate process, that the process comprises an imposter process of the legitimate process;
a file determination module, stored in the memory on the computing device, that determines that a file has been created on the computing device by the imposter process;
a security determination module, stored in the memory on the computing device, that:
   determines a security action for the file on the computing device in response to determining that the file has been created by the imposter process;
   performs the security action on the computing device for the file in response to determining the security action and thereby improving security on the computing device;
at least one hardware processor that executes the process identification module, the imposter determination module, the file determination module and the security determination module.

12. The system of claim 11, wherein a comparing module compares the attribute of the process to the attribute of the legitimate process by comparing a path of the process to an expected path of the legitimate process.

13. The system of claim 11, wherein the imposter determination module determines that the process is not the legitimate process by determining that the process does not comprise the digital signature of the legitimate process.

14. The system of claim 11, wherein the imposter determination module determines that the process is not the legitimate process by determining that the hash of the process does not match the hash of the legitimate process.

15. The system of claim 11, wherein the imposter determination module determines that the process comprises an imposter process by determining that the process comprises an instance of the legitimate process that has loaded a malicious module, wherein the malicious module is not present in a trusted instance of the legitimate process.

16. The system of claim 15, further comprising a removing module that removes the malicious module from the instance of the legitimate process.

17. The system of claim 11, wherein the security determination module determines the security action for the file in response to determining that the file has been created by the imposter process by lowering a conviction threshold for the file.

18. A non-transitory computer-readable-storage medium comprising one or more computer-readable instructions that, when executed by at least one processor of a computing device, cause the computing device to:
   identify, by the computing device, a process executing on the computing device that is subject to a security assessment;
   determine, by the computing device initiating a query, based on comparing an attribute of the process to an attribute of a legitimate process, that a similarity between the process and the legitimate process meets a predetermined match threshold based at least in part on a similarity of a name of the process with a name of the legitimate process;
   identifying the legitimate process in response to determining that the similarity between the process and the legitimate process meets the predetermined match threshold;
   determine, by the computing device, in response to identifying the legitimate process, that the process is not the legitimate process at least in part by determining that at least one of:
      the process does not comprise a digital signature that matches a digital signature of the legitimate process; and
      a hash of the process does not match a hash of the legitimate process;
   determine, based at least in part on the similarity between the process and the legitimate process meeting the predetermined match threshold and at least in part on determining that the process is not the legitimate process, that the process comprises an imposter process of the legitimate process;
   determine, by the computing device, that a file has been created on the computing device by the imposter process;
   determine, by the computing device, a security action for the file on the computing device in response to determining that the file has been created by the imposter process;
   perform, by the computing device, the security action on the computing device for the file in response to determining the security action and thereby improving security on the computing device.

19. The non-transitory computer-readable-storage medium of claim 18, wherein comparing the attribute of the process to the attribute of the legitimate process comprises comparing a path of the process to an expected path of the legitimate process.

20. The non-transitory computer-readable-storage medium of claim 18, wherein determining that the process comprises an imposter process comprises determining that the process comprises an instance of the legitimate process that has loaded a malicious module, wherein the malicious module is not present in a trusted instance of the legitimate process.

* * * * *